United States Patent
Fratti

(10) Patent No.: US 8,387,871 B2
(45) Date of Patent: Mar. 5, 2013

(54) TAMPER RESISTANT RFID TAG CIRCUIT APPARATUS AND METHOD

(75) Inventor: Roger A. Fratti, Mohnton, PA (US)

(73) Assignee: LSI Corporation, San Jose, CA (US)

( * ) Notice: Subject to any disclaimer, the term of this patent is extended or adjusted under 35 U.S.C. 154(b) by 180 days.

(21) Appl. No.: 12/976,788

(22) Filed: Dec. 22, 2010

(65) Prior Publication Data

US 2012/0160914 A1 Jun. 28, 2012

(51) Int. Cl.
 *G06K 5/00* (2006.01)
(52) U.S. Cl. ........................................................ 235/381
(58) Field of Classification Search .................. 235/379, 235/380, 381, 382, 383, 385, 492
See application file for complete search history.

(56) References Cited

U.S. PATENT DOCUMENTS

| | | | | |
|---|---|---|---|---|
| 3,495,775 | A | * | 2/1970 | Di Camillo ............. 235/201 PF |
| 6,486,768 | B1 | * | 11/2002 | French et al. ................ 340/5.92 |
| 7,286,055 | B2 | | 10/2007 | Girvin et al. |
| 2006/0109130 | A1 | | 5/2006 | Hattick et al. |

* cited by examiner

*Primary Examiner* — Seung Lee
(74) *Attorney, Agent, or Firm* — Kermit D. Lopez; Luis M. Ortiz; Ortiz & Lopez, PLLC

(57) ABSTRACT

A tamper pool RFID tag apparatus, system and method for keying the RFID tag in association with an object. An oscillator circuit configured on an RFID tag substrate enables the RFID tag to be keyed with respect to the object. One or more capacitors that are operatively connected in association with the RFID tag substrate via a substrate vias determine an oscillator frequency pulse when placed on the object. A comparator compares the oscillator frequency pulse with a predetermined pulse count stored in a latch/storing unit. The RFID tag circuit can accept the object in, for example, a vending machine, if the frequency pulse matches the predetermined pulse count in order to effectively handle object returns in a wide range of commercial applications.

20 Claims, 6 Drawing Sheets

TAMPER RESISTANT RFID TAG CIRCUIT APPARATUS AND METHOD

TECHNICAL FIELD

Embodiments are generally related to security sealing devices and techniques. Embodiments are also related to RFID (Radio Frequency Identification) tag circuits and associated components.

BACKGROUND OF THE INVENTION

RFID (Radio Frequency Identification) devices/tags are compact electronic devices mounted on a structure such as, for example, an identification card and/or a wristband for tagging a specific object. Such RFID tags are generally designed for receiving and storing identification and other data associated with the object attached thereto. The RFID tags can be configured in association with objects in order to effectively identify, authenticate, inventory, check-in and check-out the objects in a wide range of business applications such as, for example, warehouses, retailers, stores, dealerships, parking lots, airports, train stations and so forth. RFID tags can be utilized by, for example, merchants, sellers, buyers, surveyors, retailers, libraries, pharmacies, hospitals, and the like in order to effectively distribute, sell, and track information with respect to the objects.

Conventionally, an automated vending machine can be adapted for performing retail sales and handling returns with respect to the objects/items based on the RFID tag associated with the object. Such vending machines are unable to handle tampering of the objects returned by the customer upon making a poor choice. Additionally, the prior art approaches for keying the RFID tags with respect to the objects are insecure and cumbersome. Furthermore, the RFID tags are operated independent of the object and therefore unable to provide a tramper resistant solution with respect to the objects in varying commercial/retail applications.

Based on the foregoing, it is believed that a need exists for an improved tamper resistant RFID tag circuit apparatus and method for keying a RFID tag with respect to an object, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved security sealing apparatus and method.

It is another aspect of the disclosed embodiments to provide for an improved tamper resistant RFID tag circuit.

It is further aspect of the disclosed embodiments to provide for an improved technique for keying a RFID tag in association with an object.

The aforementioned aspects and other objectives and advantages can now be achieved as described herein. A tamper proof RFID tag circuit apparatus, system and method for keying a RFID (Radio Frequency Identification) tag in association with an object, is disclosed herein. An oscillator circuit (e.g., a Wien-Bridge circuit) configured on top of a RFID tag substrate enables the RFID tag (e.g., a dielectric material) to be keyed with respect to the object. One or more capacitors that are operatively connected in association with the RFID tag substrate via a substrate vias determine an oscillator frequency pulse when placed on the object. A comparator can be employed to compare the oscillator frequency pulse with a predetermined pulse count stored in a latch/storing unit. The RFID tag circuit accepts the object in, for example, a vending machine, if the frequency pulse matches the predetermined pulse count in order to effectively handle object returns in a wide range of commercial/retail applications.

The oscillator circuit operates in a calibrate mode in order to obtain the predetermined pulse count with respect to the RFID tag keyed to the object. Similarly, the oscillator circuit operates in a read mode in order to generate a logic/action output. The RFID tag circuit can be configured in association with, for example, the aforementioned vending machine, in order to effectively solve the object return problems in the vending machine. The capacitors of the RFID tag determine the oscillator frequency pulse based on a dielectric constant and a physical parameter of the object. Such tramper resistant RFD tag circuit apparatus and method effectively provides object dependent functions in order to obtain a secure and tamper resistant sealing solution in a wide range of business applications.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
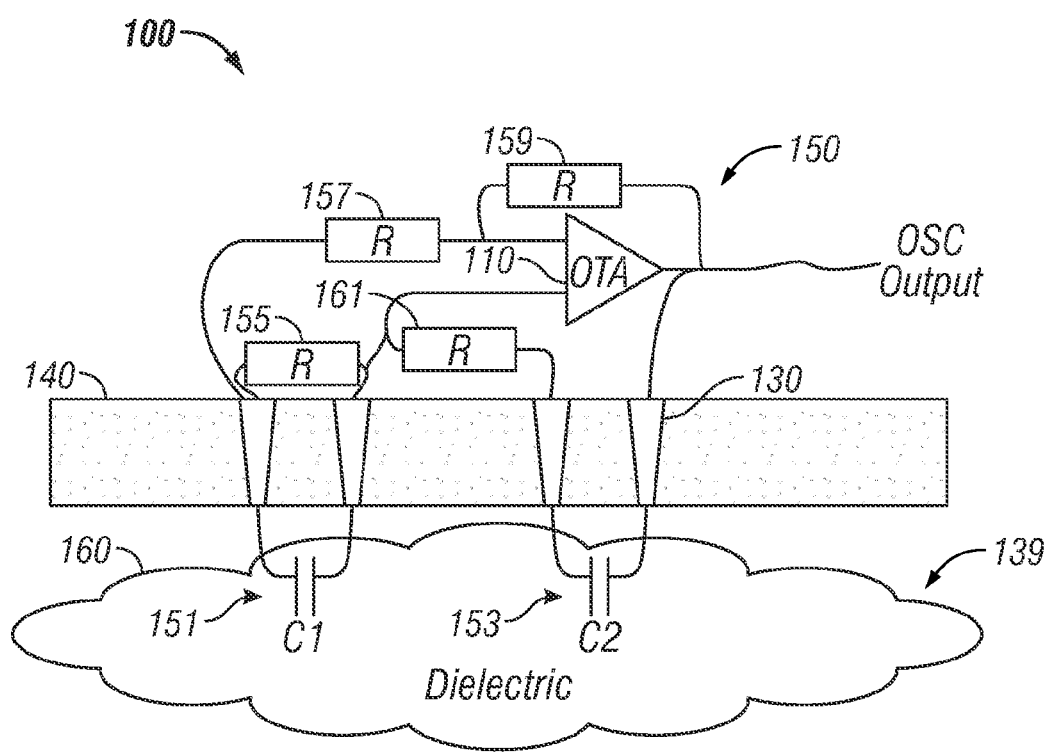
FIG. 1 illustrates a perspective view of a tamper resistant RFID tag circuit, in accordance with the disclosed embodiments.

FIG. 1 illustrates a circuit diagram of a tamper resistant RFID tag circuit 100, in accordance with the disclosed embodiments. The tamper resistant RFID (Radio Frequency Identification) tag circuit 100 possesses various features to achieve a tamper resistant sealing with respect to an object(s) 139 in a wide range of business applications. Note that an electronic integrity can be contained in the individual identity of the RFID tag circuit 100 which is permanently set during the fabrication process of the tag circuit 100. The RFID tag circuit 100 generally includes an oscillator circuit 150, an RFID tag substrate 140 and one or more capacitors such as, capacitors 151 and 153, respectively also labeled C1 and C2 in FIG. 1.

The oscillator circuit 150 configured on the RFID tag substrate 140 enables a RFID tag (e.g., a dielectric material) 160 to be keyed with respect to one or more object(s) 139. Note that the oscillator circuit 150 described herein can be such as, for example, a Wien-Bridge circuit. It can be appreciated that other types of oscillator circuit may be utilized in place of the suggested oscillator circuit, depending upon design consideration. The capacitors C1 and C2 that are operatively connected in association with the RFID tag substrate 140 via a substrate vias 130 determines an oscillator frequency pulse when placed on the object(s) 139. Resistors 155, 157, 159 and 161 form a part of the oscillator circuit 150.

The RFID tag 160 reads the information previously stored into a memory unit such as, for example, a latch/storing unit 330 and writes new information into the memory unit 330 in response to the signals from the RFID tag circuit 100. Each RFID tag 160 includes an individual code having information related to the object(s) 139. In a typical system, the RFID tag circuit 100 transmits a radio frequency signal to the remote RFID tag 160. The RFID tag 160 receives the frequency signal from the RFID circuit 100 and modulates the received signal with the stored pulse signals in the RFID tag 160. The RFID circuit 100 also produces a sequence of signals in accordance with the individual code of the tag 160 The RFID tag circuit 100 further decodes such signals in order obtain the information from the RFID tag 160. Similarly, the tag 160 may also decode signals received from the circuit 100 and write information to its local memory.

Note that objects 139 can be such as, for example, a Blister Pack, a beer pack, a pharmaceutical item, a medicine bottle, an electronic item, a packaging of an item, food, toy, or the like. The capacitors C1 and C2 of the RFID tag circuit 100 determines the oscillator frequency pulse with respect to the object(s) 139 based on a dielectric constant and physical parameters of the object(s) 139. The RFID tag circuit 100 can be configured in association with, for example, a vending machine in order to effectively solve the object return problems in the vending machine. Such a circuit apparatus 100 can effectively accept the object(s) 139 in the vending machine when the frequency pulse matches the predetermined pulse count in order to effectively handle object returns in a wide range of commercial/retail applications.

Figure 2:
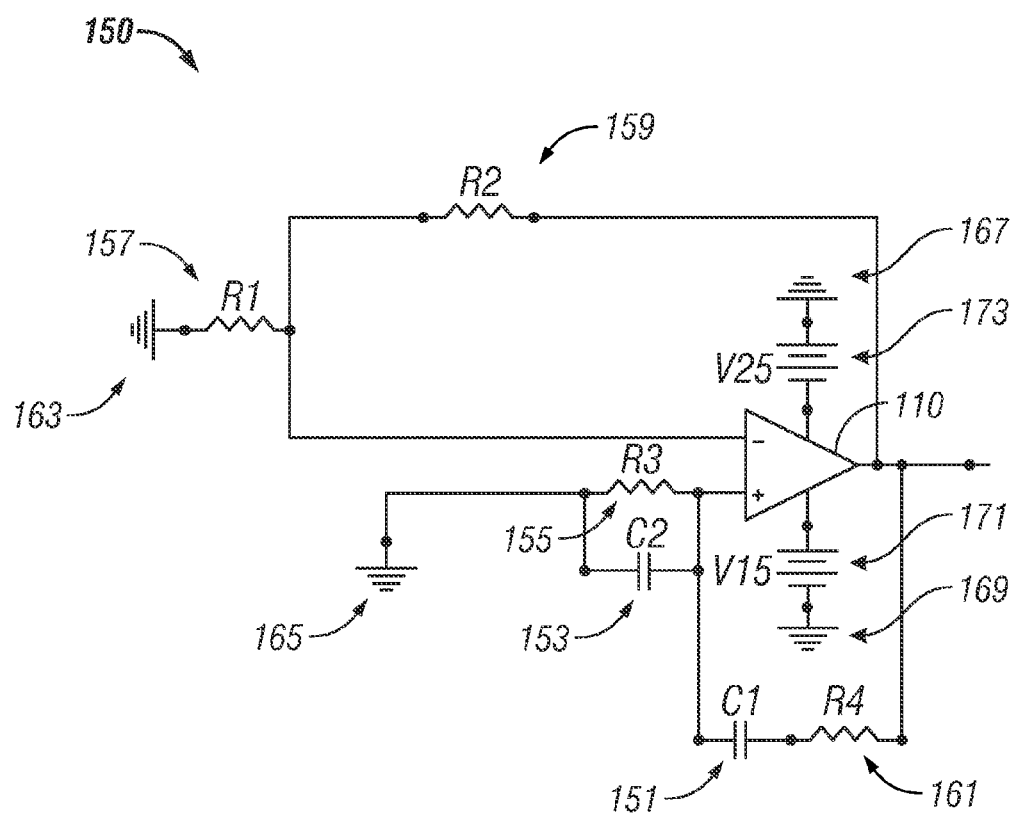
FIG. 2 illustrates a circuit diagram of a Wien-Bridge circuit, in accordance with the disclosed embodiments.

FIG. 2 illustrates a circuit diagram of the Wien-Bridge circuit 150, in accordance with the disclosed embodiments. Note that in FIGS. 1-7, identical or similar blocks are generally indicated by identical reference numerals. The Wien-Bridge circuit 150 generally includes an oscillator 110 for generating an oscillatory output signal without having an input source. The circuit 150 also includes as indicated in FIG. 1 includes resistors 155, 157, 159 and 160. Resistor 157 is connected to ground 163 and to resistor 159 and also to a negative input of the oscillator 110. The resistor 159 is electrically connected not only to the resistor 163 but also to the output of the oscillator 110. The resistor 155 is electrically connected in parallel with the capacitor 155. Additionally, both the capacitor 153 and the resistor 155 are connected to ground 165 and a positive input to oscillator 110. Additionally, the capacitor 151 is connected serially to resistor 161.

The oscillator 110 is also connected to a voltage source 171, which in turn is connected electrically to ground 169. The oscillator 110 is also connected to a voltage source 173, which in turn is connected to a ground 167.

Figure 4:
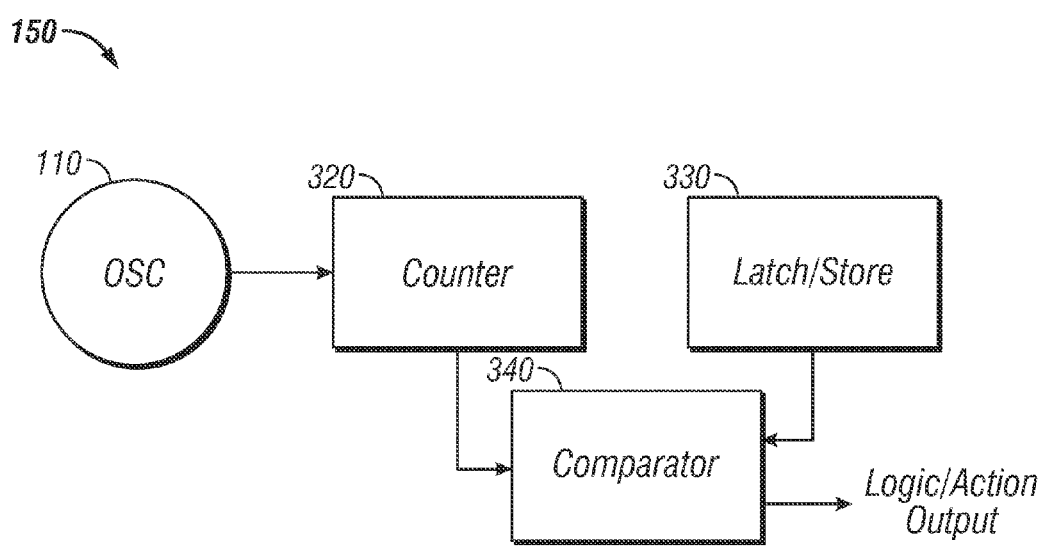
FIG. 4 illustrates a block diagram of the Wien-Bridge circuit operating in a read mode, in accordance with the disclosed embodiments.

The resistor networks R3 and R4 shown in FIG. 4 connected to the positive terminal forms a frequency selective feedback network in order to cause oscillations in the Wien-Bridge circuit 150. The Wien-Bridge circuit 150 further amplifies the signal with the two negative feedback resistors R1 and R2. The Wien-Bridge circuit 150 is a type of electronic oscillator that generates sine waves in a large range of frequencies. The circuit 150 generally includes one or more resistors R1, R2, R3, and R4 and capacitors C1 and C2. Note that the Wien-Bridge circuit 150 can be also viewed as a positive feedback system combined with a band pass filter.

Figure 3:
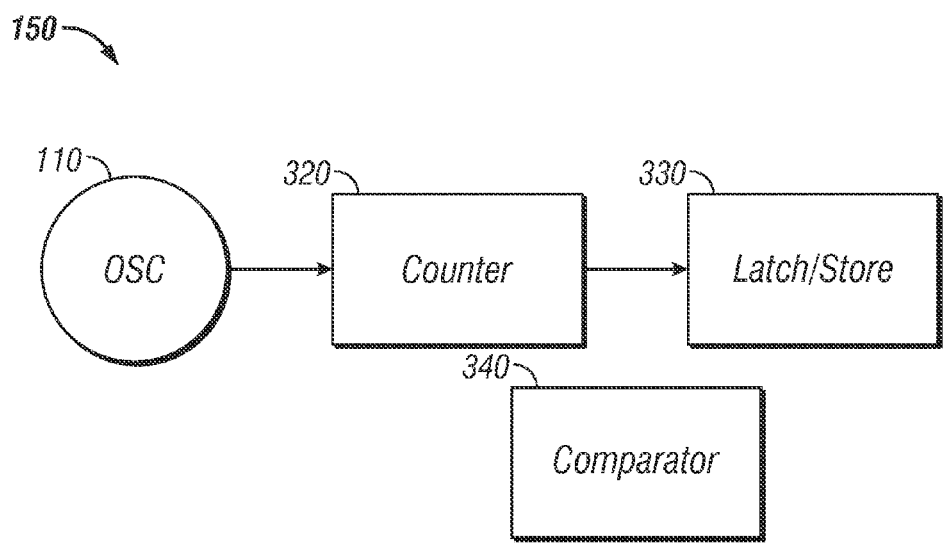
FIG. 3 illustrates a block diagram of a Wien-Bridge circuit operating in a calibration mode, in accordance with the disclosed embodiments.

FIG. 3 illustrates a block diagram of the Wien-Bridge circuit 150 operating in a calibration mode, in accordance with the disclosed embodiments. The Wien-Bridge circuit 150 generally includes an oscillator 110, a comparator 340, a counter 320 and the latch/storing unit 330. The oscillator circuit 150 operates in the calibrate mode in order to obtain the predetermined pulse count with respect to the RFID tag 160 keyed to the object(s) 139. In calibration mode, the oscillator circuit 150 generates frequency pulse signals based on a predetermined pulse count generated by the counter 320. Further, the output in the counter 320 can be stored into the latch/storing unit 320 as a predetermined reference count.

FIG. 4 illustrates a block diagram of the Wien-Bridge circuit 150 operating in a read mode, in accordance with the disclosed embodiments. The comparator 340 compares the oscillator frequency pulse with a predetermined pulse count stored in the latch/storing unit 330. If the frequency pulse matches the predetermined pulse count, the RFID tag circuit 100 accepts the object(s) 139 in a vending machine in order to effectively handle object returns in a commercial/retail application. For example, if the RFID tag 160 is placed and keyed on a cloth jacket, the RFID tag circuit 100 distinguishes/determines the status of the cloth jacket based on the reading information from the RFID tag associated with the cloth jacket. If the frequency pulse in the RFID tag associated with the cloth jacket matches the predetermined pulse count, the RFID tag circuit 100 accepts the cloth jacket and effectively handles object returns in the commercial application.

Figure 5:
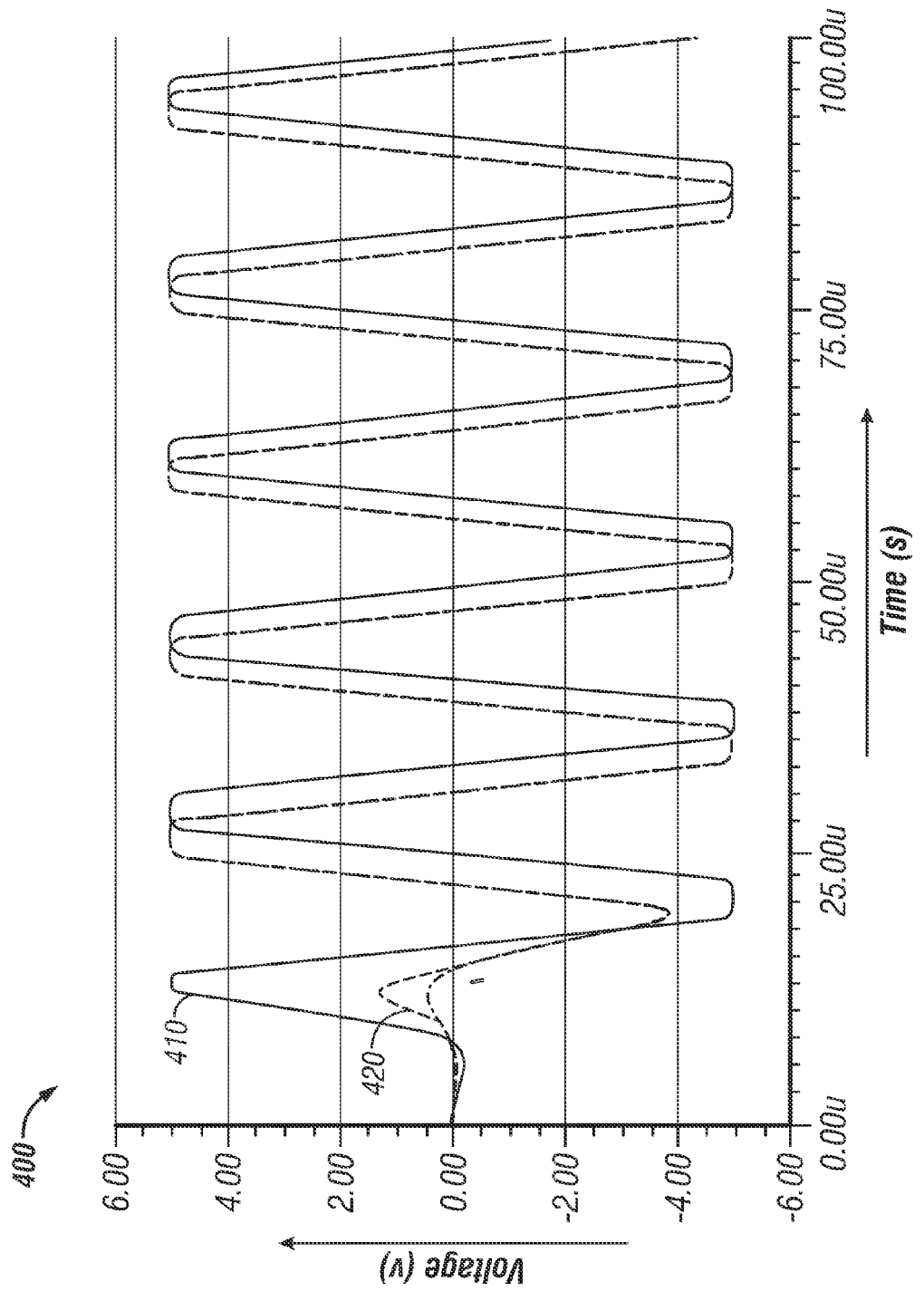
FIG. 5 illustrates a graph representing a transient start up in the tamper resistant RFID tag circuit, in accordance with the disclosed embodiments.

FIG. 5 illustrates a graph 400 indicative of transient startup signals associated with the Wien-Bridge circuit 150, in accordance with the disclosed embodiments. Graph 400 illustrates curves 410 and 420, which plot data (i.e., Voltage vs Time) that represent pulses for different gain configurations, which can be set during the fabrication of the RFID tag circuit 100 to tailor the desired response to different applications. For example a lower gain setting that results in curve 420 when the RFID tag circuit 100 at an elevated temperature can be utilized to determine if the temperature of the product has increased. The pulse count may miss the first pulse and therefore be lower due to the slower start up time. This feature can be employed to indicate that the product been heated and should no longer be accepted for return.

Additionally, the RFID tag circuit 100 can be configured in association with the vending machine discussed herein in order to effectively solve the object return problems in the vending machine. The curve 410 thus can represent the pulses generated by the oscillator circuit 150 at a properly chilled temperature and the curve 420 represents the pulses generated by the oscillator circuit 150 at an elevated, non-ideal temperature. The effective load (L) in the Wien-Bridge circuit 150 can be represented as indicated in equation (1) below:

$$L \sim w^2 C^2 R^2 + 1/w^2 C(Av-1) \quad (1)$$

In equation (1) above, the parameter 'C' can represent capacitances C1 and C2 and the parameter 'R' can represent resistance.

Figure 6:
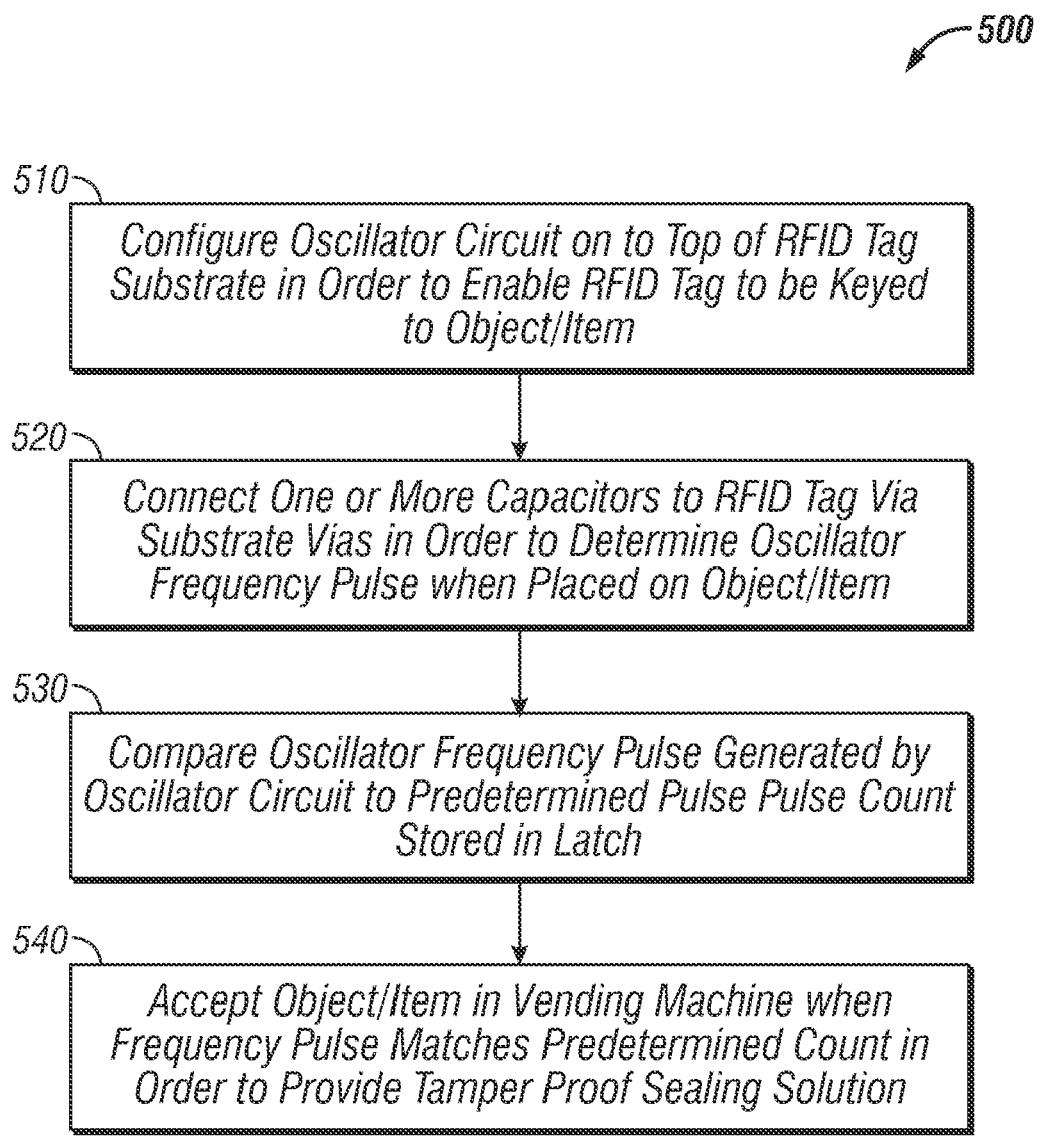
FIG. 6 illustrates a high level flow chart of operation illustrating logical operation steps of a method for keying a tamper resistant RFID tag with respect to the object, in accordance with the disclosed embodiments.

FIG. 6 illustrates a high level flow chart of operation illustrating logical operation steps of a method 500 for keying the tamper resistant RFID tag 160 with respect to the object(s) 139 in a business application, in accordance with the disclosed embodiments. The oscillator circuit 150 can be configured into the top of the RFID tag substrate 140 in order to enable the RFID tag 160 to be keyed with the object(s) 139, as illustrated at block 510. Again as a reminder, note that the RFID tag substrate can be a dielectric material configured with the object(s) 139 and the oscillator circuit 150 can be a Wien-Bridge circuit. Thereafter, one or more capacitors such as, for example, the capacitors C1 and C2 can be operatively connected in association with the RFID tag substrate 140 via a substrate vias 130 in order to determine the oscillator frequency pulse when placed on the objects) 139, as depicted at block 520.

The comparator 340 associated with the oscillator circuit 150 can be adapted to compare the oscillator frequency pulse with a predetermined pulse count stored in the latch/storing unit 330, as illustrated at block 530. The object(s) 139 can be accepted in the vending machine when the frequency pulse matches the predetermined pulse count in order to effectively handle object returns. Such tramper resistant RFID tag circuit apparatus and method therefore effectively provide object dependent functions in order to obtain a secure, tamper resistant sealing solution in a wide range of business applications.

Figure 7:
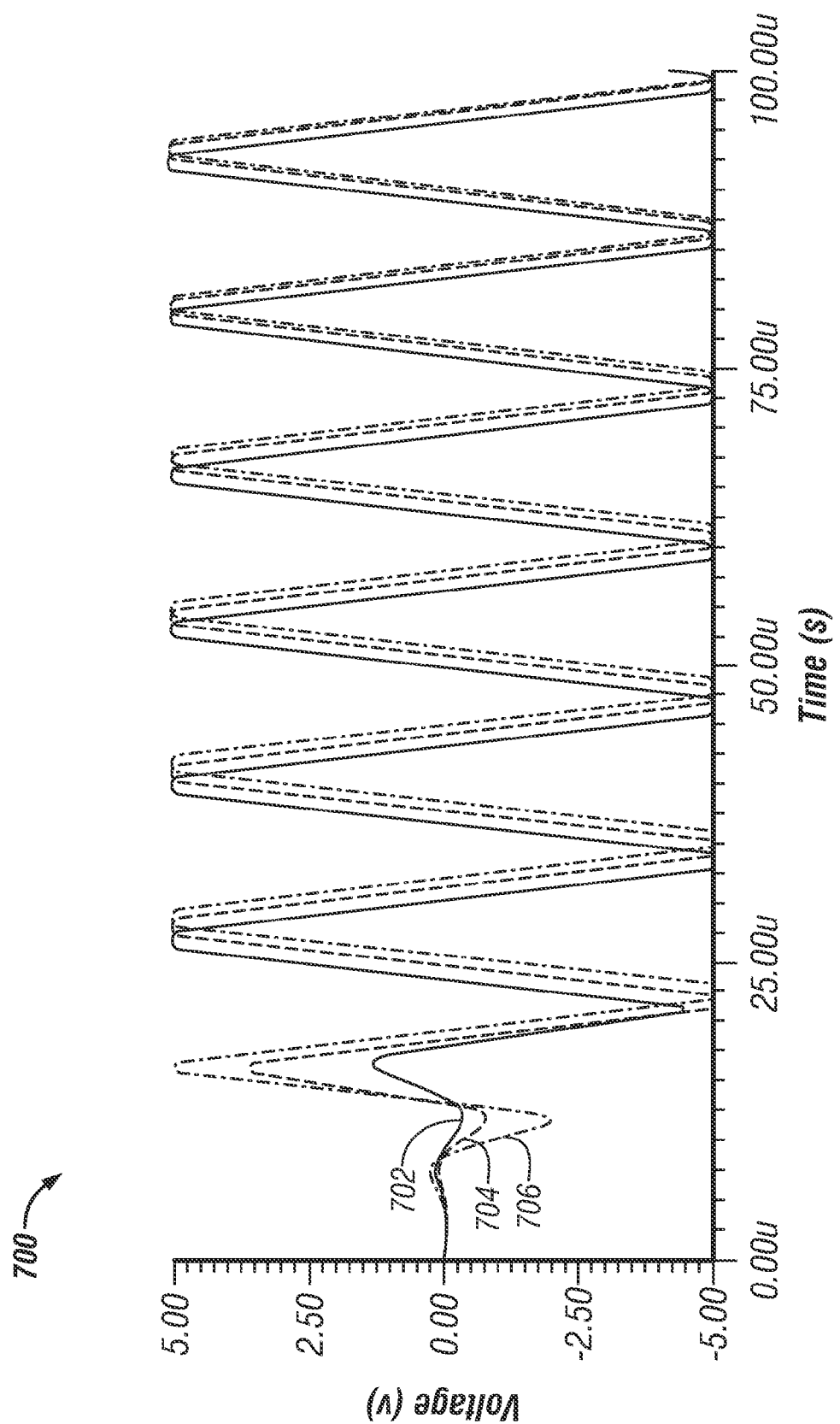
FIG. 7 illustrates a graph depicting simulation data indicative of the response, or oscillator frequency with a reduced amount of capacitance, in accordance with the disclosed embodiments.

FIG. 7 illustrates a graph 700 depicting simulation data indicative of the response, or oscillator frequency with a reduced amount of capacitance, in accordance with the disclosed embodiments. The graph 700 includes curves 702, 704, and 706, which indicates a higher frequency or number of pulses in the sari period of time. If the tag described herein was originally placed on a high dielectric leather jacket and then removed and placed on a lower dielectric cotton jacket, for example, the oscillator in the tag would behave differently by generating a different number of pulses.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A tamper resistant tag circuit apparatus, said apparatus comprising:
   an oscillator circuit configured on a substrate of a tag to permit said tag to be keyed to an object;
   at least one capacitor that is operatively connected with said substrate of said tag to determine an oscillator frequency pulse when placed on said object; and
   a comparator that compares said oscillator frequency pulse with a predetermined pulse count in order to accept said object when said oscillator frequency pulse matches said predetermined pulse count.

2. The apparatus of claim 1 further comprising a latch for storing said predetermined pulse count with respect to said tag.

3. The apparatus of claim 1 wherein said oscillator circuit is operable in a calibrate mode to obtain said predetermined pulse count with respect to said tag keyed to said object.

4. The apparatus of claim 1 wherein said oscillator circuit is operable in a read mode in order to generate a logic/action output.

5. The apparatus of claim 1 wherein said at least one capacitor determines said oscillator frequency pulse based on a dielectric constant and a physical parameter of said object.

6. The apparatus of claim 1 wherein said oscillator circuit comprises a Wien-Bridge circuit.

7. The apparatus of claim 1 wherein said substrate comprises a RFID tag substrate.

8. The apparatus of claim 1 wherein said tag comprises a dielectric RFD tag material.

9. The apparatus of claim 1 further comprising a vending machine, wherein said comparator compares said oscillator frequency pulse to said predetermined pulse count in order to accept said object in said vending machine when said oscillator frequency pulse matches said predetermined pulse count.

10. A tamper resistant tag circuit system, said system comprising:
    a vending machine;
    an oscillator circuit configured on a substrate of a tag to permit said tag to be keyed to an object;
    at least one capacitor that is operatively connected with said substrate of said tag to determine an oscillator frequency pulse when placed on said object; and
    a comparator that compares said oscillator frequency pulse with a predetermined pulse count in order to accept said object in said vending machine when said oscillator frequency pulse matches said predetermined pulse count.

11. A method for providing tamper resistant tag circuit, said method comprising:
    configuring an oscillator circuit on a substrate of a tag to permit said tag to be keyed to an object;
    operatively and electrically connecting at least one capacitor to said substrate of said tag to determine an oscillator frequency pulse when placed on said object; and
    comparing, utilizing a comparator, said oscillator frequency pulse with a predetermined pulse count in order to accept said object when said oscillator frequency pulse matches said predetermined pulse count.

12. The method of claim 11 further comprising providing a latch for storing said predetermined pulse count with respect to said tag.

13. The method of claim 11 wherein said oscillator circuit is operable in a calibrate mode to obtain said predetermined pulse count with respect to said tag keyed to said object.

14. The method of claim 11 wherein said oscillator circuit is operable in a read mode in order to generate a logic/action output.

15. The method of claim 11 further comprising configuring said at least one capacitor to determine said oscillator frequency pulse based on a dielectric constant and a physical parameter of said object.

16. The method of claim 11 further comprising configuring said oscillator circuit from a Wien-Bridge circuit.

17. The method of claim 11 wherein said substrate comprises a RFID tag substrate.

18. The method of claim 11 wherein said tag comprises a dielectric RFID tag material.

19. The method of claim 11 further comprising providing a vending machine, wherein said comparator compares said oscillator frequency pulse to said predetermined pulse count in order to accept said object in said vending machine when said oscillator frequency pulse matches said predetermined pulse count.

20. The method of claim 11 further comprising:
    configuring said oscillator circuit from a Wien-Bridge circuit; and
    providing said substrate as an RFID tag substrate.

* * * * *